Aug. 11, 1931.  G. A. BURNHAM  1,818,686
SELF CONTAINED RURAL SUBSTATION
Filed Feb. 6, 1928  3 Sheets-Sheet 1

Inventor:
George A. Burnham
by Greenwood
atty

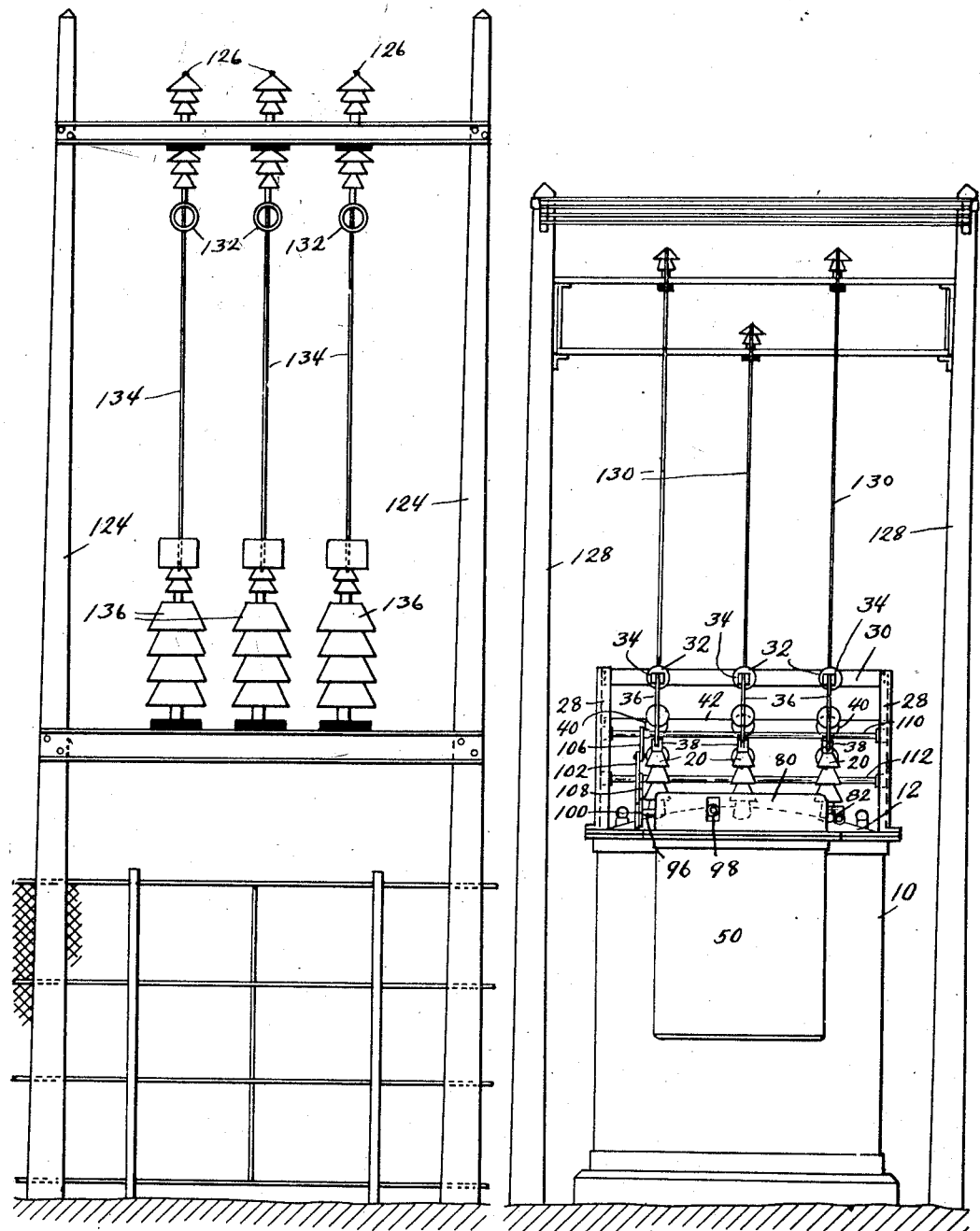

Inventor.
George A. Burnham

Patented Aug. 11, 1931

1,818,686

UNITED STATES PATENT OFFICE

GEORGE A. BURNHAM, OF SAUGUS, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

SELF-CONTAINED RURAL SUBSTATION

Application filed February 6, 1928. Serial No. 252,183.

This invention relates to electric distribution systems and particularly to substations which are located in relatively isolated, as farming, sections and serve to supply a moderate amount of low tension power mainly to house lighting and low power consuming systems. Such substations must be cheap since the amount of power controlled thereby does not warrant an expensive installation and yet they must be reliable.

The rural substation to which this invention is particularly directed usually comprises a fenced-in enclosure containing cement foundations on which are separately mounted a transformer and an oil circuit breaker. A fabricated steel frame structure is located over the transformer and switch and has mounted thereon disconnecting switches for both the high tension and low tension circuits and the various conductors which establish connection between the oil and disconnecting switches and transformer. Such a substation is relatively expensive because of the necessity of the fabricated steel structure and also of the plurality of foundations. Furthermore, all of these separate pieces of apparatus have to be assembled and the fabricated structure built at the location, thus necessitating high labor and haulage costs.

It is an object of the present invention to provide a substation wherein the transformer, the oil switch, and the disconnecting switches are a unitary piece of apparatus that can be constructed in quantity at a factory and can be shipped in assembled condition and installed in position without further labor and expense than the supplying of a suitable base on which to mount the structure and the connecting of the high and low tension circuits, thus resulting in a relatively great saving of expense over the usual small substation construction.

A further object of the invention is generally to improve the construction and operation of electrical distribution systems and apparatus.

Fig. 2 is a view taken along line 2—2 of Fig. 1.

Fig. 3 is a view taken along line 3—3 of Fig. 1.

Figure 1:
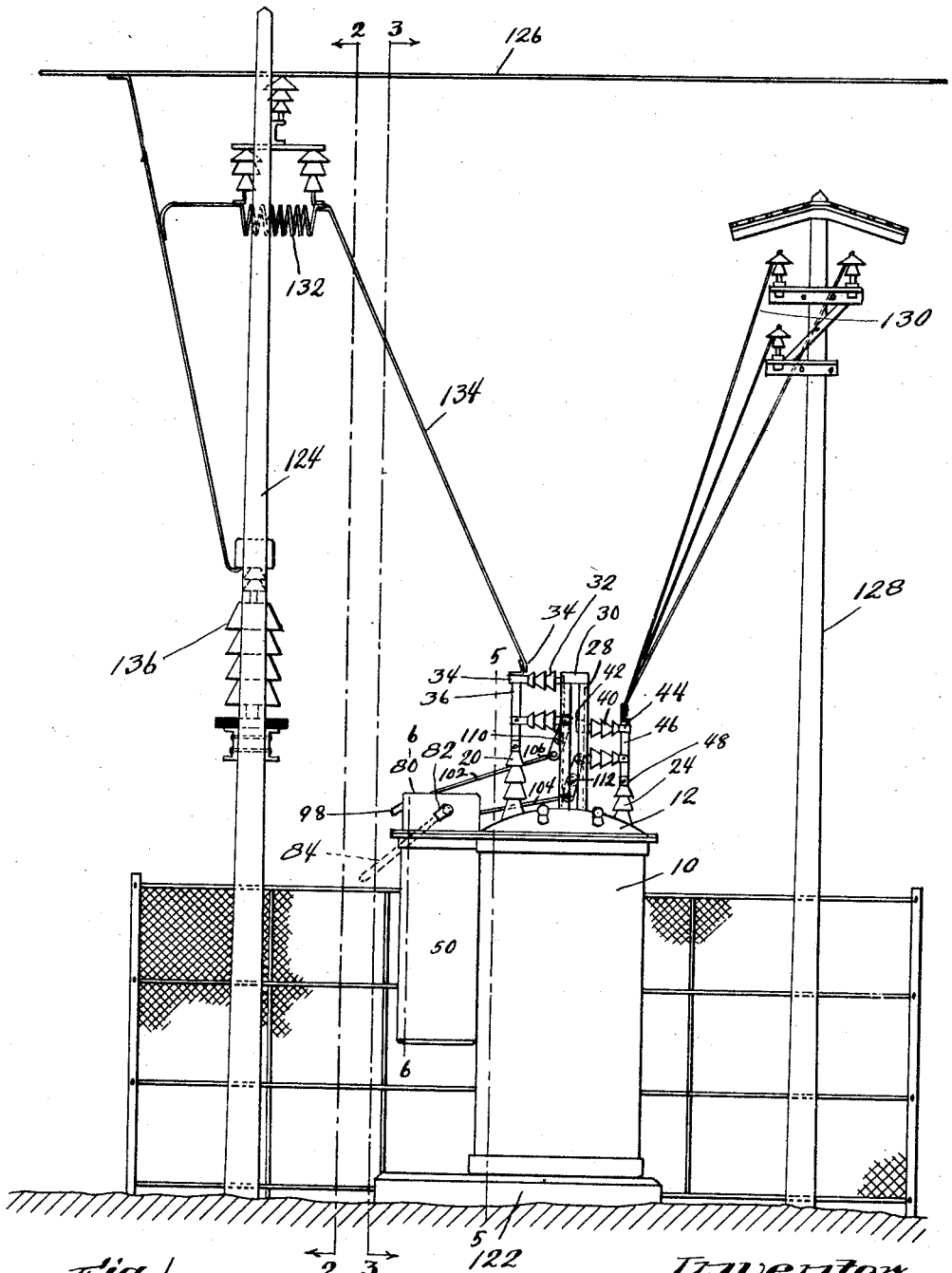
Fig. 1 is a side elevation of an outdoor substation embodying the invention.

In accordance with the present invention, the transformer, the oil circuit breaker and the high and low tension disconnecting switches are all joined as a unitary structure and are made in effect integral with and are carried by the transformer casing. The transformer casing 10 is of general rectangular shape and has a cover 12. A three-phase transformer 14 having star-connected primary windings is located within the casing and immersed in the oil therein and is connected by rods 16 with the cover so that when the cover is raised off the oil receptacle, the transformer is also elevated.

The similar terminals 18 of the high tension or primary windings of the transformer are brought out through insulating bushings 20 carried by the cover 12 at one side thereof and the low tension or secondary terminals 22 are brought out through the smaller insulating bushings 24 carried by the cover 12 on the other side thereof. A disconnecting switch supporting structure comprising the vertical beams 28 and the top connecting beam 30 is fixed to said cover 12 and upstands vertically thereabove between said bushings 20 and 24. Insulators 32 are carried by said beam 30 and comprise supports for the stationary switch members 34 of the high tension disconnecting switches. The cooperating movable switch members comprising the knife blades 36 are pivoted to and upstand above the terminals 38 of the high tension bushings 20.

Insulators 40 for the low-tension disconnecting switches are carried by an intermediate beam 42 of said supporting structure on the side opposite the high tension disconnecting switches and are provided with stationary switch members 44 to which the outgoing low tension leads are adapted to be connected. Movable switch members comprising the knife blades 46 cooperate with said switch members 44 and are pivoted to the terminals 48 of the low tension bushings 24.

The oil circuit breaker is located in an oil containing compartment 50 carried by one of the long sides of the transformer casing 10. A vertical plate 52 is carried by an extension 12a of the cover 12, which extension forms a cover for the switch casing 50, and depends below said extension into said casing 50 close to and overlies in part the vertical side wall 10a of the transformer casing 10. Spaced horizontal bushings 54 are carried by said plate 52 beneath the oil level and are connected with the remaining terminals 56 of the high tension primary windings of the transformer and are provided, within the switch casing 50, with contact blocks 58 which form the stationary switch members of the oil circuit breaker. Spaced insulating pillars 60 are also carried by said plate 52 below said bushings 54 and have pivotally mounted thereon the movable switch or bridging members 62 which are adapted to engage the cooperating stationary switch members 58. Said bridging members 62 are electrically connected together by the conductor 64 to connect the primary windings of the transformer in star or Y, and said conductor can, if desired, be grounded, although such connection is not shown.

The movable switch members are connected independently through insulating rods 66 with arms 68 of an operating shaft 70, which shaft has an arm 72 that is connected with a rod 74 extended upwardly and loosely through the cover plate 12a and pivoted to an arm 76 fixed intermediate its ends on an operating shaft 78 located in the cover 80 of the switch casing. Said shaft 78 extends through the side of the cover and terminates in a socket 82 in which a removable operating handle 84, see Fig. 1, can be inserted to close the switch manually.

The switch is provided with a latch 86 carried by an arm of the shaft 70 that engages a fixed projection 88 whereby to hold the switch closed. An overload tripping coil 90 that preferably is energized from the low tension circuit of the transformer has a core 92 that is adapted to raise the latch upon overload in the low tension circuit and open the switch thus to open the common connection between the primary windings of the transformer. The switch can be tripped open manually by the tripping lever 93 that extends outside the cover 80 of the switch casing and is connected to the latch by means of a link 94.

The cover 80 for the switch casing also encloses mechanism for operating the high and low tension disconnecting switches. Said mechanism includes a pivoted shaft 96 having a socket 98 fixed to that end of the shaft external of the casing 80, which socket also is adapted to receive the operating handle 84. A yoke 100 is fixed to said shaft and has rods 102 and 104 extended therefrom to arms 106 and 108 respectively that are fixed to shafts 110 and 112 journalled in the vertical beams 28 of the disconnecting switch supporting structure. Arms are fixed to said shafts and are pivoted to insulators 114 and 116 respectively that are pivotally connected to the disconnecting switch blades 36 and 46 respectively. Thus, when said operating shaft 96 is rocked in opposite directions, the disconnecting switches will be opened and closed. The disconnecting switch mechanism is interlocked with the oil circuit breaker mechanism by means of an arm 118 fixed to said shaft 96. Said arm overlies the arm 76 of the oil circuit breaker mechanism and is thus prevented from moving in a direction to open the disconnecting switches until after the oil circuit breaker has been opened.

The same body of oil occupies both the switch and transformer casings. The switch casing, below the top of the transformer casing wall 10a is isolated from the transformer casing, however, and oil sludge and carbon formed by the circuit interrupting arcs can settle therein and thus be retained from passage to the transformer casing and adulterating the oil therein.

Figures 7, 8:
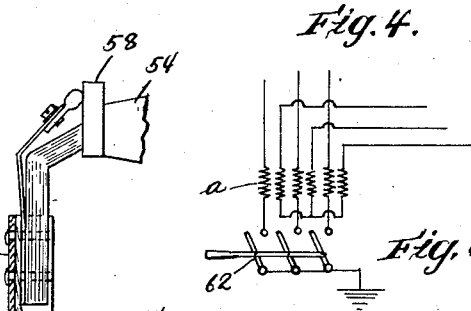
Fig. 7 is an enlarged sectional detail illustrating one of the poles of the circuit breaker.
Fig. 8 is a diagram of the circuit connections.

The connections between the three-phase transformer and the oil circuit breaker are illustrated in Fig. 8 and are essentially as described in my copending application Serial No. 175,578, filed March 15, 1927.

Figures 4, 5:
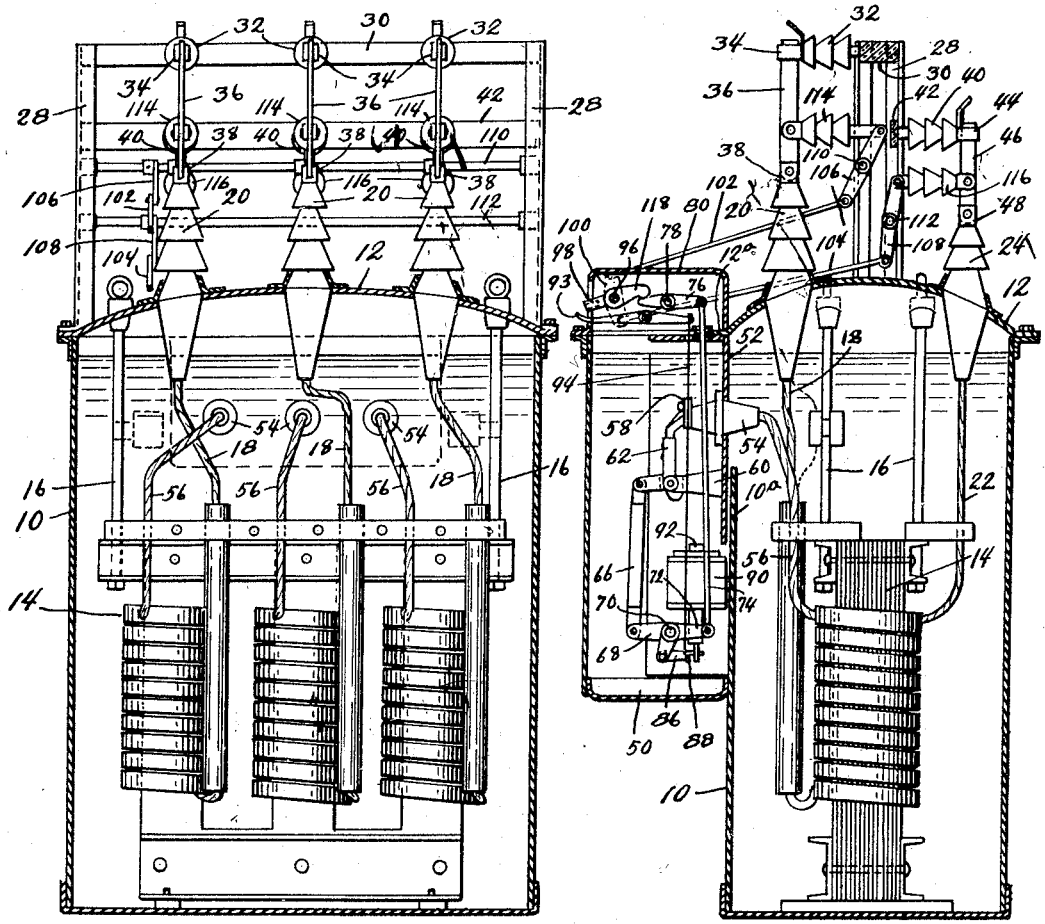
Fig. 4 is a vertical sectional elevation through the apparatus of Fig. 1.
Fig. 5 is a section along line 5—5 of Fig. 1.
Figure 6:
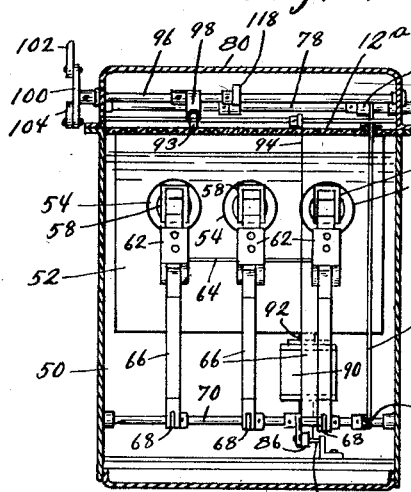
Fig. 6 is a section along line 6—6 of Fig. 1 and illustrating more particularly the switch mechanism.

As shown in this figure, the primary windings a of the high tension transformer are connected in star or Y through the switch 62. With this arrangement more power can be interrupted than with the usual arrangement of circuit breaker and transformer since, for one reason, there is no difference of potential between the stationary and movable switch members at the moment of separation. This arrangement also permits a reduction in the number of high tension bushings heretofore required as but three bushings are required as contrasted with six for the usual construction and the circuit breaker bushings can be placed under oil as illustrated by the bushings 54 of Fig. 4 and thus be made smaller and cheaper than the usual switch bushing since the oil provides the main insulation for the terminals of the switch and transformer.

The substation apparatus above described can be completely erected at the factory and shipped to its location of installation and can be installed on a single cheap foundation 122 between the supporting poles 124 for the high tension line conductors 126 and the poles 128 for the low tension line conductors 130. The high tension line is connected through reactors 132 and leads 134 to the terminals 34 of the high tension disconnecting switches and the low tension leads 130 are connected with the terminals 44 of the low tension disconnecting switches. The substation may be protected on the high tension side by lightning arrestors 136 supported on the poles 124 and connected in the usual manner.

I claim:

1. An outdoor substation adapted for direct connection to overhead distribution lines including a power transformer having an enclosing casing, a circuit breaker carried by said casing and connected with the windings of said transformer, and disconnecting switches carried by and disposed exteriorly of the transformer casing and connected with the transformer windings therein, the fixed terminals of said disconnecting switches also constituting exposed terminals for said overhead lines.

2. A substation including as a unitary structure, a power transformer having primary and secondary windings and an enclosure casing, a supporting frame work carried by said transformer casing and extended thereabove, incoming and outgoing line terminals carried by said frame work, disconnecting switches carried by said transformer casing and connecting said incoming and outgoing line terminals with said transformer primary and secondary windings, and a circuit breaker carried by said transformer casing and connected with the windings therewithin.

3. A substation including as a unitary structure, a power transformer having an enclosing casing, an oil immersed circuit breaker carried by said transformer casing and having connections with the windings of said transformer below the oil level, a frame carried by said transformer casing and extended upwardly thereabove, line terminals carried by said frame work, and disconnecting switches carried by said transformer casing and connecting said line terminals with the terminals of said transformer.

4. In a portable outdoor substation, the combination of a unitary structure including a casing having oil containing switch and transformer compartments, the switch compartment being supported by the transformer compartment, a power transformer immersed in the oil of said transformer compartment, a circuit breaker immersed in the oil of said switch compartment, connections extended under the oil between said compartments and the switch and transformer, a cover for said casing having transformer terminals extended thereabove, a supporting frame work connected to said casing and extended above said cover, line terminals carried by said frame above said transformer casing, and disconnecting switches also located above said transformer casing connecting said transformer and line terminals.

5. In an outdoor substation, the combination of an oil containing casing having transformer and switch compartments, a multiphase transformer in said transformer compartment, a multi-phase oil circuit breaker in said switch compartment, a cover for said casing, transformer terminals extended through and upwardly above said cover, a frame carried by said casing extended above said cover, line terminals carried by said frame, disconnecting switches connecting said line and transformer terminals, circuit breaker operating mechanism contained in said switch compartment, and disconnecting switch operating mechanism also contained in said switch compartment having operating connections extended to said disconnecting switches.

6. A three-phase unitary outdoor substation including an oil containing casing having a cover, a three phase transformer contained in said casing having three high tension terminals extended through said cover and connected with the high tension windings of said transformer and three low tension terminals extended through said cover and connected with the low tension windings of said transformer, an oil circuit breaker carried by said casing below the oil level therein and having connections beneath the oil with the high tension windings of said transformer to form a Y connection between the windings, a frame carried above said cover, line terminals carried by said frame, and disconnecting switches connecting said line terminals with said transformer.

7. An outdoor substation including a casing-enclosed transformer, terminals extended through the casing, a switch frame located above the top of and carried by said transformer casing, disconnecting switches carried by said frame having connections with said transformer terminals, and an interrupting switch carried by said transformer casing having connections with the transformer within the transformer casing.

8. An outdoor substation including a casing-enclosed transformer, terminals extended through the casing, a switch-frame located above the top of and carried by said transformer casing, disconnecting switches carried by said frame having connections with said transformer terminals, an interrupting switch carried by said transformer casing having connections with the transformer within the transformer casing, operating mechanism for the disconnecting switches, and interlocking mechanism connecting said disconnecting and interrupting switches.

9. A portable outdoor substation including as a unitary structure, a transformer having an oil containing casing and terminals extended through the casing thereabove, a circuit breaker having an oil containing casing carried by the transformer casing and terminals having connections with the transformer internally of the transformer casing and below the oil therein, a switch and insulator-supporting frame carried by the casing above the top thereof adjacent said transformer terminals, insulators carried by said frame, some of which carry line terminals, and disconnecting switches carried by others of said insulators and connected electrically with said transformer terminals.

10. A substation including a multi-phase transformer having windings provided with line terminals, a casing enclosing said transformer, a circuit-interrupter arranged to interrupt the circuit through the transformer, a casing enclosing said interrupter carried by said transformer casing disconnecting switches connected with the line terminals of said windings, and located above the top of said transformer casing and having an operating rod which overlies said transformer casing and extends to said switch casing, and interlocking mechanism in said switch casing between said interrupter and disconnecting switches so that the disconnecting switches can be operated only when the interrupter is open.

11. A unit-substation which is adapted to be connected between overhead high tension transmission and low tension distribution systems including an oil containing casing, a multi-phase power transformer contained in said casing and having one of its windings star-connected, a cover for said casing having high and low tension bushings extended therethrough and terminated beneath the level of the oil in said transformer casing, said bushings also extending above said cover and terminating in fixed contact terminals of line disconnecting switches, the other terminals of which switches are separately connected electrically with the high and low tension lines of the systems, a second casing carried by said transformer casing, a circuit interrupter contained therein and arranged to control the star-connection of said transformer windings, and operating means for said interrupter and disconnecting switches carried by said transformer and interrupter casings.

12. A unit-substation including a main enclosing casing, a multi-phase transformer contained in said casing having at least one of its windings star-connected, a secondary casing carried by a side wall of said main casing and having an opening near the top thereof through said side wall into said main casing, said main and secondary casings adapted to contain bodies of oil which are in free communication, a circuit interrupter contained in said secondary casing and adapted to control the star-connection of said transformer windings, and shielding means interposed between said interrupter and the opening into said main casing and terminating beneath the said opening.

13. A unit-substation apparatus including a main enclosing casing having an opening in a side wall thereof near the top of the casing, an auxiliary enclosing casing carried by said main casing having an opening in a side wall thereof which registers with the opening in the side wall of said main casing, said main and auxiliary casings adapted to contain bodies of oil, a multi-phase transformer contained in said main casing having one of its windings star-connected, a circuit interrupter contained in said auxiliary casing opposite said opening and adapted to control the star-connection of said transformer windings, a cover common to both said casings, and shielding means interposed between said interrupter and the opening into said main casing having a fluid tight connection with said cover and extending below said opening.

14. A unit-substation which is adapted to be connected directly to overhead transmission lines including a transformer enclosing casing adapted to contain a body of oil, an interrupter enclosing casing carried by said transformer casing, a cover comprising a common closure for said casings, a supporting framework carried by said transformer casing and extended thereabove, line terminals carried by said framework and comprising fixed contact members of line disconnecting switches, insulating bushings carried by and extended through and above and below said cover, the upper extended ends of said bushings comprising the support for the movable contact members of the aforesaid line disconnecting switches, and the lower ends thereof being connected with the windings of said transformer.

In testimony whereof, I have signed my name to this specification.

GEORGE A. BURNHAM.